United States Patent [19]
Brotschi

[11] 3,837,104
[45] Sept. 24, 1974

[54] METHOD AND SYSTEM FOR KEEPING RECORD OF THE CONTENTS OF A CONTAINER
[76] Inventor: Rolf Peter Brotschi, Hirschweg 9, 7067 Grunbach, Germany
[22] Filed: May 4, 1973
[21] Appl. No.: 357,340

[30] Foreign Application Priority Data
May 8, 1972  Germany............................ 7217361

[52] U.S. Cl................................ 40/104.18, 283/55
[51] Int. Cl............................................. B42d 15/00
[58] Field of Search....... 40/104.13, 104.18, 104.19, 40/158 B, 159; 283/36–42, 55

[56] References Cited
UNITED STATES PATENTS
710,947  10/1902  Buskirk............................ 40/104.13
981,543  1/1911  Edgar, Jr. ........................ 40/104.13
3,555,713  1/1971  Leinbach ........................ 40/104.19

*Primary Examiner*—J. H. Wolfe
*Attorney, Agent, or Firm*—Michael S. Striker

[57]  ABSTRACT

In a system for keeping record of the contents of a storage means, two groups of pages are provided with pockets and indications of the contents of various pockets, and a pad of three forms is marked with two kinds of information. One form of the three is inserted into a pocket of the one group in accordance with a first type of information, another form is inserted into a pocket of the other group in accordance with a second type of information, the remaining form being attached to the item to be stored.

10 Claims, 5 Drawing Figures

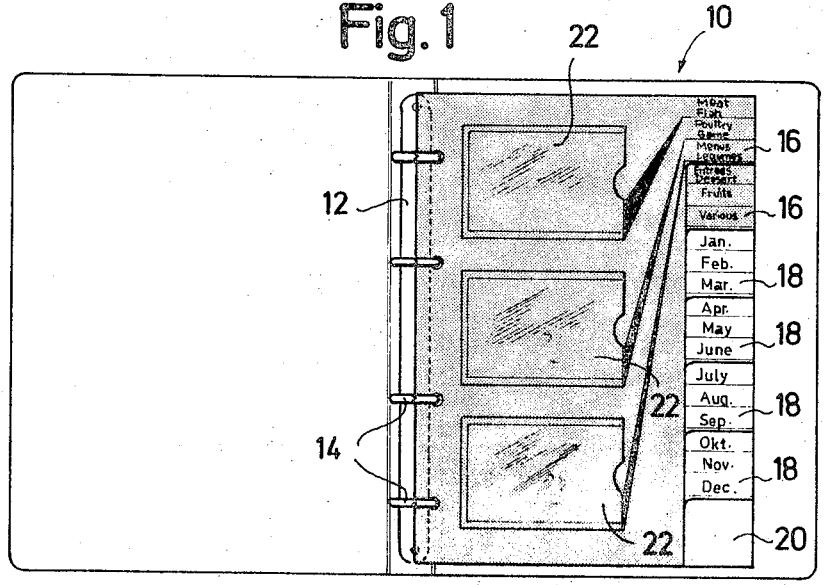
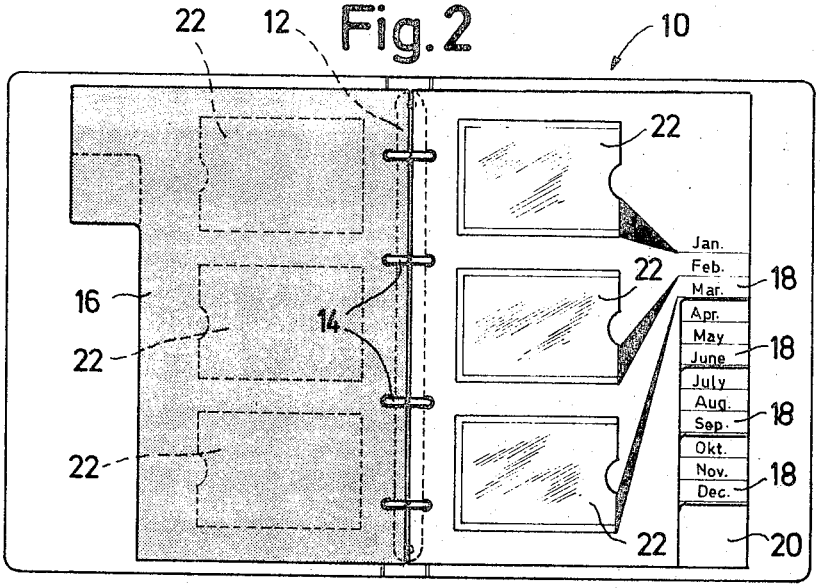

3,837,104

METHOD AND SYSTEM FOR KEEPING RECORD OF THE CONTENTS OF A CONTAINER

BACKGROUND OF THE INVENTION

The present invention relates generally to record keeping, and more particularly to a system and a method of keeping record of the contents of a storage means, such as food in a freezer used in private residences and institutional kitchens.

It is a well established fact that freezers have found increasing use in private residences as well as in institutional kitchens, cafeterias, restaurants and the like. This increased use can be attributed to the particular advantages of this method of food preservation when compared with the other methods, be it the extension of the obtainable storage period, or the possibility of preserving complete meals or fruit and vegetables without spoilage and without impairing the appearance, quality or taste of the so preserved food, provided that the food items are stored for periods not exceeding the maximum permissible storage time (i.e., "expiration date") which is peculiar to each particular food item.

Experience has shown that it is a very difficult task to have a detailed and reliable knowledge of the whereabouts of the stored food items, bearing in mind not only the kind and supply of the various items, but also their expiration dates. This task is particularly difficult to accomplish in private residences where the amounts and turnover of food items are relatively small, but the variety and number of stored items are usually large. Thus, it is extremely difficult for a homemaker to be at all times aware of the kinds, expiration dates and exact locations in the freezer of all of the stored food items.

In view of this state of affairs, the advantages gained by using this method of food storage and preservation may be partially or entirely forfeited, for instance by exceeding the time limits for safe consumption of the various food items. If these limits are exceeded, the least what can happen is that the food loses its taste, but where such perishable goods as meat or fish are affected, the items whose expiration period has already been exceeded have to be disposed of, lest they present a danger of detrimental health effects. In addition thereto, the lack of awareness of the arrangement of the contents of the freezer and the difficulty of finding the desired item if many of the stored items are wrapped in a non-transparent foil result in unduly long periods during which the door or the lid of the freezer is open while searching for the particular item, which not only leads to an increase in the consumption of electric energy, but may also result in spoilage of some food items, either by being directly exposed to the air at ambient temperature or by an overall increase in the temperature in the freezer during this extended period.

SUMMARY OF THE INVENTION

It is an object of the present invention to overcome these aforementioned problems by providing a method and system for keeping record of the contents of a storage means, in particular of food in a freezer.

It is a concomitant object of this invention to devise a method and a system for record keeping which are both easy and reliable, and which may be used in adverse (such as wet or humid) conditions without impairing the reliability or the appearance of the system.

It is a further object of the invention to provide a system for carrying out the record keeping method, which renders possible an easy survey of the food being stored in the freezer in respect to its variety and available supply on the one hand, and the expiration date on the other hand.

Yet a further object of the invention is to provide a system of record keeping in which each food item kept in the freezer is easily distinguishable from the other items, even if wrapped in a material which is not transparent.

Still another object of the invention is to provide a system of record keeping, rendering possible an easy recognition of the location of a particular item in the freezer before opening the latter.

In pursuance of these objects and others which will become apparent hereafter, one feature of the invention resides in a system for record keeping comprising a binder accommodating several pages which are provided with pockets or receptacles and with identification tabs. The pages are preferably divided in two groups, the respective page of the first group bearing on its tab markings of the kind of the food items to be stored, the markings on the tab being visually connected with the appropriate pockets, while the respective page of the other group bears markings of a certain date or a certain time period, preferably a certain month on its tab and the markings on the tab are visually connected with the appropriate pockets.

Another feature of the invention is the provision of a supply of forms arranged in sets, each of the sets consisting of three forms onto which at least two types of information pertaining to the food item to be stored are recorded at the time of its intended storage. The first type of information is an indication of the kind of food to be stored, and the second type of information indicates the date after which it is not safe to consume the particular food item.

Yet another feature of the present invention resides in a method of keeping record of the contents of a freezer, wherein the two types of information are recorded onto a set of forms, a first of these forms is inserted into the appropriate pocket of the first group of pages in accordance with the variety of food this item belongs to, the second of these forms is accommodated in a pocket of the second group of pages, which is associated with the month in which the particular item is to be consumed the latest, and a third form of this set, which may preferably have a self-adhesive back surface, is attached to the wrap or container of the item to be stored for identification purposes.

Still another feature of the invention is an exchangeable accommodation of the two groups of pages in a ring binder for easy handling. This is further facilitated if, according to a currently preferred embodiment of the invention, the pages and the associated pockets are made of moisture-resistant material, such as synthetic plastic material, the binder itself has a moisture-resistant coating and the forms to be inserted into the pockets are likewise moisture-resistant, so that the system can be used in actual kitchen conditions where contact with moisture often cannot be precluded, without suffering distortions and other effects detrimental to its appearance or function.

A further feature of the invention involves providing a space on each of the forms of the set where the exact location of the food item to be stored in the freezer is entered prior to inserting the forms into their associated pockets, so as to ensure that the item can readily be found in the freezer at any time, particularly at the time of demand for such item, and thus to reduce the time of searching for said item and, consequently, the period during which the freezer door or lid must be open.

The novel features which are considered as characteristic for the invention are set forth in particular in the appended claims. The invention itself, however, both as to its construction and its method of operation, together with additional objects and advantages therof, will be best understood from the following description of specific embodiments when read in connection with the accompanying drawings.

BRIEF DESCRIPTION OF THE DRAWING

FIG. 1 shows a top plan view of an embodiment of a binder constituting part of an embodiment according to the invention;

FIG. 2 shows a view similar to that of FIG. 1 but the binder being opened on a different page;

DESCRIPTION OF THE PREFERRED EMBODIMENTS

Figure 3:
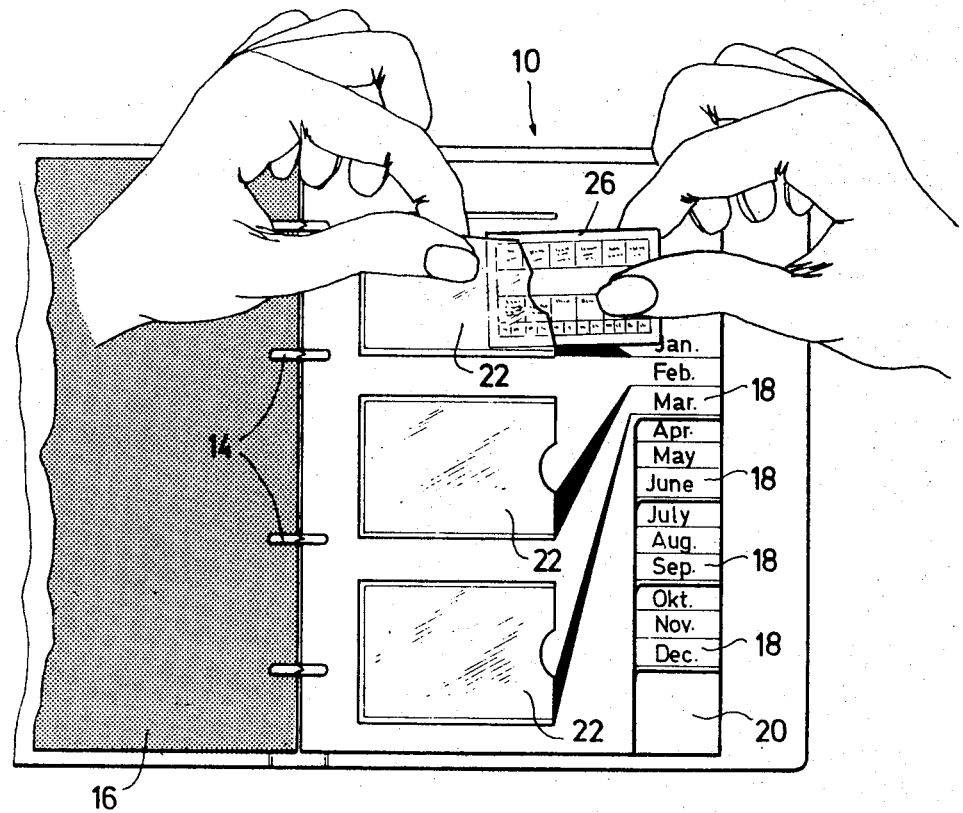
FIG. 3 shows the insertion of a form in a pocket of the page of the binder as shown in FIG. 2.

FIGS. 1, 2 and 3 show a view of a binder 10, which is illustrated in accordance with a preferred embodiment of the invention as a ring binder. The binder itself has a conventional design and, as customary in such a binder, a rail 12, which is rigidly connected to the back of the binder, supports clamps 14 which can be manually opened and closed for insertion of exchangeable pages or insers 16, 18 and 20 into, and engagement with, the binder 10. According to the invention, pockets or receptacles 22 are attached to the front surfaces of the inserts 16 and 18. According to a presently preferred embodiment, the pockets 22 are produced by joining a substantially rectangular section of a transparent foil material having a sufficient stiffness to the material of the page at least along the lower and inner edge of the section, by welding, glueing or another suitable joining method. Experience has shown that it is particularly advantageous if the inserts 16 and 18 are made of synthetic plastic material and the rectangular, transparent foil sections are joined thereto by thermal welding.

It can be seen in FIGS. 1 and 2 that the inserts of the binder 10 are divided in two groups, the first group comprising the inserts 16 while the other group comprises the inserts 18. The remaining insert 20 carries a table and does not belong to any of the two groups of inserts; the purpose of this table will be explained later.

In the illustrated embodiment, each of the inserts 16 of the first group has three pockets 22, and the first group encompasses two inserts 16, but neither the number of pockets nor the number of inserts is limited to that shown, but rather can be smaller or larger as the need may be.

It is shown in FIG. 1 that each of the pockets 22 of the inserts 16 is visually connected with an associated description of the contents of the pocket by means of a wedge-shaped line, but it is evident that this illustrated embodiment is not essential to the invention, since the connecting lines can have any other shape or can be omitted altogether if the proper identification of the various pockets is located above or below the pockets. In the illustrated embodiment, the description of the contents of the pockets is provided at the right side of each of the inserts and, with a particular advantage, on so-called tabs which permit identification of the various inserts 16, 18 and 20 at the first glance, whenever the front of the jacket of the binder 10 is opened, by representing a complete index of the contents of the binder.

It is best seen in FIG. 1 that the uppermost pocket 22 of the first insert 16 is visually connected with the description "meat, fish". The remaining pockets 22 of the inserts 16 are associated with other foods or food varieties, as shown by the descriptions on the tabs in FIG. 1.

The second group, in the illustrated example of the embodiment, comprises four inserts 18, each carrying three pockets 22, and a description indicating a respective month is associated with the corresponding pocket in a manner similar to that explained heretofore in connection with the first group of inserts 16. Consequently, the inserts 18 of the illustrated example of embodiment form a term almanac which covers the period of 12 months. It is to be understood that here again a larger or a smaller number of inserts could be provided so as to cover a larger or a smaller period of time. However, experience has shown that in most cases the coverage of a 12 month period is quite sufficient.

The last page or insert 20, which does not necessarily have to be provided but which represents a useful addition, is not separately shown in the drawing. The insert 20 carries a table indicating the maximum storage periods for the various food items and, consequently, facilitates the recordal of one type of information on forms which will be explained later in connection with FIGS. 4 and 5, and the insertion thereof into the appropriate pockets. In addition thereto, the insert 20 can also contain additional information or recommendations to the user of this system and of the freezer. In particular, these recommendations may concern the correct freezing and defrosting procedures for the individual food items.

Figure 4:
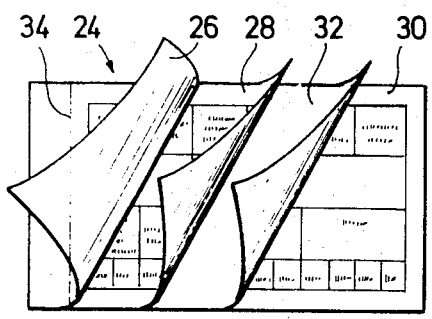
FIG. 4 shows a perspective view of a set of forms according to the invention.
Figure 5:
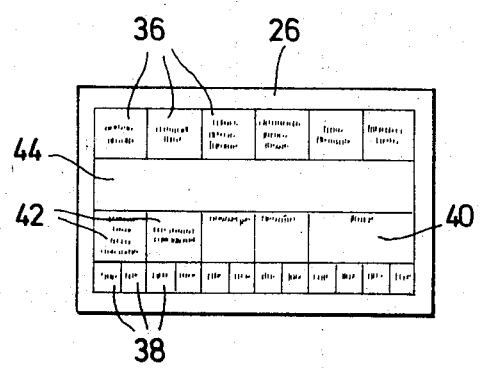
FIG. 5 shows a top plan view of a single form.

FIGS. 4 and 5 of the drawings show the details of a set of forms designated in general by a reference numeral 24. A supply of such sets is available and one such set is used each time a particular food item is to be put into the freezer. Each of the sets 24 comprises three forms 26, 28 and 30 as shown in FIG. 4 which are to be used in conjunction with the above described binder in a manner which will be described later, in order to accomplish the results called for by the method according to the invention. According to the currently preferred embodiment of this set, a carbon paper 32 is inserted between the forms 28 and 30, whereas the form 28 is made of material which changes its color when acted upon by pressure forces, i.e., so-called NCR paper. The forms 26, 28 and 30 as well as the carbon paper 32 are joined together so as to form a pad, and are perforated parallel to one, in the drawing the left, edge of the pad for easy separation of the individual forms.

Having described the system to be used for keeping record of the contents of the storage means, in particular a freezer, the following will describe the method used in connection with this system which assures easy recognition of the contents of the freezer in respect to the variety and expiration dates of the various food items to be stored in the freezer.

One set of forms is used for each item to be stored in the freezer. If such an item is to be put into the freezer after being properly wrapped if not already in a suitable container or wrapping, the uppermost form 26 of the set 24 is marked in a proper manner. It is usually sufficient if the various data pertaining to the food item to be stored are marked on the forms by checking the appropriate space of the form 26. In order to render possible such a simple method of recording the necessary information, the forms are visually divided into individual spaces, as shown in particular in FIG. 5, wherein a group of spaces 36 situated along the upper edge of the forms is, for instance, associated with the individual food type or food item, while a group of spaces 38 situated along the lower edge of the forms is associated with the particular months. In addition thereto there can also be provided a space 40 in which the date of storage may be marked, and still other spaces 42 can be provided in which the information pertaining to the kind of preparation, the number of portions, the identification of the particular shelf where the food is stored and further similar data may be entered. Finally, experience has shown that it is advantageous to provide yet another, larger space 44, in which individual remarks may be entered. It is to be noted in this connection, that the expiration date checked in one of the spaces 38 depends on the storage date entered in the compartment 38, the dependency being established by the maximum permissible storage period. So, for instance, if vegetables have been cooked and stored in March, and the maximum permissible storage time for the same is two or three months, then the compartment 38 corresponding to the month "May" or "June" is checked.

Since the three forms are united to form a duplicating pad, the same information which is entered on the original form 26 also appears on the forms 28 and 30. Subsequently to recording the information, the forms are separated along the perforated line 34. One of the forms, preferably the somewhat thicker form 30 which is preferably provided with a self-adhesive back surface, is attached to the food item to be stored, respectively to its wrapping or container. One of the remaining forms 26 and 28 is then inserted into one of the pockets 22 of the first group of inserts 16. If the same example as described above is used, the form is inserted into the lowermost pocket of the first insert 16 which is associated with menus and vegetables. If there already are other forms in this pocket 22, it is advisable to insert the new form behind the forms already in the pocket since it is most probable that the food items identified by these old forms will have to be consumed sooner than the new item.

Finally, the third form 28 is inserted into a pocket 22, provided on one of the inserts 18, which corresponds to the month indicated in one of the compartments 38. Again, if the same example is adhered to, the form 28 is to be inserted into the central or the lowermost pocket 22 of the second insert 18, the pockets being associated with the months of May or June respectively.

It can be seen from the above description that the method and the system according to the invention bring about a variety of particular advantages. Namely, if the individual food items are provided with description in accordance with the above described method, and if the individual forms are arranged in the manner explained above, then the user of the freezer has an immediate, reliable and simple access to information regarding the contents of the freezer. Basically, there are two possibilities:

a. the user can search for a particular food item, or b. the user can determine whether the limit of the maximum storage period has already been reached or is to be reached in the near future for any particular item stored in the freezer.

If the search according to (a) is contemplated, it is sufficient if the user surveys the contents of the pocket of the inserts 16 whose description corresponds to the particular food item or type. In this manner, it is very easy to establish whether a sufficient supply of that particular item is still available in the freezer.

On the other hand, if the search according to (b) is to be conducted, the user has to examine whether the pocket of the second group of inserts 18, which corresponds to the current month, still contains any forms for the current year. Since it is possible that the maximum permissible storage periods extend over a period of more than one year, it can happen that the pocket for the current month already contains forms which will expire a year from the same. However, these forms are easily distinguishable from the forms for the current year, since the date when the particular item has been stored is included in the compartments 40 of the form, and it is likely that the expiration periods of the foods whose forms are inserted into the same pocket will be of comparative length. Accordingly, if one of the forms in the respective pocket expires in more than a year, it is likely that also other forms will expire in about a year, and the indication of storage date is sufficient for recognition of the expiration year.

After conducting the search according to (a) or (b) and wishing to take the particular food item out of the freezer, the user has to remove both of the forms from their repective pockets. However, this is very easy to accomplish, since each of the forms bears, in addition to the indication of its own placement, a cross-reference to the placement of the other form. So, for instance, if food item is found in a search according to (a), the form is taken out of the pocket of one of the inserts 16, and the corresponding form is found in a pocket of one of the inserts 18 in accordance with the indicia on the form 26 showing the expiration date of the particular item and thus the location of the form 28.

Since each of the forms also includes an information about the exact location of the particular food item in the freezer, such as the shelf, in an appropriate compartment 42, the long and laborious search for the item is disposed of. Rather, the particular food item can be found almost instantaneously based on the information on the form. In this connection, it has to be noted that the recordal of the information pertaining to the location of the item in the freezer can be conducted before the item is placed into the freezer. However, this presumes an exact knowledge on the part of a user of the availability of space on various shelves before opening the freezer door. Therefore, it is more likely that the information relating to this location will be entered on one or both of the forms 26 and 28 only after the particular item has been stored away. The forms according to the invention are particularly suitable for this purpose, since even after the pad has been separated and the carbon paper thrown away is it possible to simultaneously enter this information on both forms, since the form 28 is made of an NCR material. After establishing the exact location of the food item on the shelves, the freezer door is opened, and a short percursory look at the form 30 attached to the wrapping or container of the desired food item guarantees that the appropriate item is taken out of the freezer, even without opening the wrap.

It will be understood that each of the elements described above, or to or more together, may also find a useful application in other types of applications differing from the types described above.

While the present invention has been described in connection with a currently preferred embodiment as exemplified in the accompanying drawings, it is evident that various other applications of this system and method according to the invention are possible both within and without the food preservation field. Consequently, the invention is not intended to be limited to the details shown, since various modifications and structural changes may be made without departing in any way from the spirit of the present invention.

So, for instance, it is possible to provide for a more or less subtle division of the expiration dates, and it is also possible to provide other or additional compartments on the forms. Furthermore, it is possible, instead of providing just one type of set of forms, to provide a plurality of such types, each for a different food type and differing from other by color or the like, so as to make misplacement of the forms into inappropriate pockets more difficult. Also, there is a possibility to provide either different colors for various tabs or printed pictorial symbols or the like instead of the descriptions, as shown in the drawings or, instead of writing on the forms, the appropriate spaces can be punched out, thus disposing of the need of providing carbon papers or special paper treatments for simultaneous information recordal. Finally, instead of using a binder, a so-called leporello folder can be used, the folder being formed from an elongated strip and folded in a zig-zag fashion, and wherein the pages thus formed have the same function as the inserts of the binder. Herein, the front page of the folded pages can have a function corresponding to the first group of inserts 16, while the back page serves in a like manner as the second group of inserts 18.

Without further analysis, the foregoing will so fully reveal the gist of the present invention that others can, by applying current knowledge, readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an arrangement of the character described for keeping record of the different items in a storage means, in particular of a plurality of different food items in a freezer, a combination comprising a binder; at least a first and a second set of pages accommodated in said binder; a first and a second plurality of substantially identical receptacles on said first and second set of pages, respectively; a plurality of different first indicia associated with each of said first pages indicating a different kind of items and a plurality of different second indicia associated with each of said second pages indicating a corresponding different characteristic of each of said different food items; and a supply of sets of recording forms, each set comprising at least three forms containing identical recording spaces for recording on all forms of any set identical indicia indicating a different kind of item and the different characteristic of the respective item, a first one of said forms of each set being adapted for insertion into a receptacle of said first plurality according to said first indicia, a second form of each set being adapted for insertion into a receptacle of said second plurality according to said second indicia, and a third form of each set being adapted for attachment to the corresponding item to be stored in said storage means.

2. A combination according to claim 1, wherein said binder is a ring binder and said pages are provided with a plurality of holes for exchangeable engagement in said ring binder.

3. A combination according to claim 1, wherein said pages are of moisture-resistant material.

4. A combination according to claim 1, wherein said pages are of synthetic plastic material.

5. A system according to claim 4, wherein said receptacles are of synthetic plastic material and are bonded to said pages.

6. A combination according to claim 1, wherein said receptacles are of transparent foil material.

7. A combination according to claim 1, wherein said receptacles have a substantially rectangular shape, the dimensions thereof substantially corresponding to those of said forms.

8. A combination according to claim 1, wherein each of said receptacles has two edges and is permanently attached to the respective page along said two edges.

9. A combination according to claim 1, wherein the third one of said forms is provided with a self-adhesive back surface.

10. A combination according to claim 1, wherein an integral portion of each page of said first plurality constitutes an identification tab indicating the type of information associated with said first page and an integral portion of each page of said second plurality constitutes an identification tab indicating the type of information associated with said second page.

* * * * *